Patented Dec. 5, 1950

2,532,430

UNITED STATES PATENT OFFICE 2,532,430

METHOD FOR PREPARATION OF VINYL SILICON CHLORIDES

Corneille O. Strother, Buffalo, and George H. Wagner, Kenmore, N. Y., assignors to The Linde Air Products Company, a corporation of Ohio No Drawing. Application January 3, 1947, Serial No. 720,108

5 Claims. (Cl. 260—448.2)

The invention relates to organosilicon compounds comprising in the molecule, a silicon atom, at least two chlorine atoms, and at least one vinyl radicle. The type formula of the compounds contemplated by the invention is

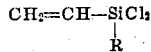

where R stands for H, Cl or $CH_2=CH-$. The particular compounds are vinyl silicon trichloride, divinyl silicon dichloride, and vinyl silicon dichloride, $CH_2=CH-SiHCl_2$. The invention includes processes and catalyst-containing compositions for making these compounds. Since vinyl silicon dichloride is a highly useful compound, and since we have found no mention of it in the prior art, it is claimed herein as a new composition of matter.

Broadly speaking, the process of our invention comprises heating silicon in contact with vinyl chloride and in the presence of a catalytic metal. A number of metals are known to promote reaction between silicon and such organic chlorides as methyl chloride, and these metals are useful catalysts in our process, tin and copper being preferred.

It has been proposed to react vinyl chloride with silicon by heating these substances together in the presence of copper, intended to serve as a catalyst. It was stated that the reaction proceeded only with great difficulty and quite small quantities of vinyl chlorosilanes were obtained. The process was so unsatisfactory that an indirect process involving the dehydrochlorination of α and β chloroethyltrichlorosilanes was preferred. In contrast, we have found that by a proper choice of the silicon-catalyst composition, the reaction proceeds readily and with good yields, including a substantial proportion of vinyl silicon dichloride.

In our preferred method of making the reaction mixture, a chloride of a catalytic metal, such as stannous chloride or cuprous chloride, is mixed with powdered silicon, or a silicon alloy or silicide, and the mixture is heated to decompose the chloride, forming and volatilizing $SiCl_4$. The product so obtained is improved if heated in hydrogen, and is also improved if any metal chloride escaping decomposition in the first step is extracted with a suitable organic solvent, such as acetone or ether, as illustrated by the following example:

Anhydrous stannous chloride (458 grams) was intimately mixed with powdered silicon (458 grams of 65 mesh and smaller). The mixture was heated at 350°–400° C. under 25 mm. pressure for 13 hours. Silicon tetrachloride (77 per cent of the theoretical quantity) was evolved according to the reaction:

$$2SnCl_2 + Si \rightarrow SiCl_4 + 2Sn$$

The resulting mixture was extracted with acetone and dried in vacuo. It contained about 24 per cent of tin. The mixture was then heated at 450° C. for 5 hours in a slow stream of hydrogen. In the above example the hydrogen treatment was carried out in a vertical tube of Pyrex glass, 28 inches long and having an inside diameter of 2 inches. The stated quantity of material, when at rest, occupied about 20 inches of the length of the tube. When the hydrogen treatment had been completed, vinyl chloride was passed upwardly through the mass in the same glass tube, at various rates and temperatures as shown in the following table. The rates of flow were such that mild agitation of the silicon-tin mix was effected.

| | A | B | C | D | E | F |
|---|---|---|---|---|---|---|
| Temperature, ° C | 260 | 400 | 400 | 475 | 550 | 560 |
| Vinyl chloride fed, g./hr | 47 | 46 | 77 | 101 | 42 | 43 |
| Duration, hours | 14.5 | 17.0 | 5.5 | 4.5 | 18.0 | 17.2 |
| Efficiency, weight:[1] | | | | | | |
| Total product per cent | 42 | 59 | 65 | 58 | 62 | 50 |
| $CH_2=CHSiCl_3$ do | 16.1 | 24.2 | 18.3 | 23.0 | 29.3 | 20.4 |
| $(CH_2=CH)_2SiCl_2$ do | 11.8 | 19.2 | 15.3 | 2.8 | 3.6 | 1.8 |
| Efficiency, mol:[2] | | | | | | |
| $CH_2=CHSiCl_3$ do | 18.7 | 28.1 | 21.2 | 26.7 | 34.0 | 23.7 |
| $(CH_2=CH)_2SiCl_2$ do | 8.2 | 15.7 | 12.5 | 2.3 | 2.9 | 1.5 |

[1] Grams of product per gram of vinyl chloride consumed, multiplied by 100.
[2] For the reactions
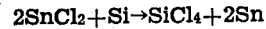
$3CH_2=CHCl + Si \longrightarrow CH_2=CHSiCl_3$
$2CH_2=CHCl + Si \longrightarrow (CH_2=CH)_2SiCl_2$ Each product yielded a fraction boiling below 90° C., the boiling point of vinyl silicon trichloride. This low-boiling fraction increased from 15 per cent by weight of the total product formed at 260° C. to 43 per cent when the reaction temperature was 550° C. About one-sixth of the low-boiling material was the new compound vinyl silicon dichloride, having an uncorrected boiling point of 66.5° C. and the following analysis. (The numbers in parenthesis are the theoretical values for $CH_2=CHSiHCl_2$.)

Carbon _____ 17.6% (18.9)
Hydrogen _____ 3.1% (3.2)
Chlorine _____ 56.7% (55.8)

A determination of the degree of unsaturation indicated 1.1 double bonds per molecule.

What is claimed is:

1. Process of preparing vinyl silicon chlorides which comprises reacting silicon with stannous chloride to reduce the latter and thereby produce a mix containing silicon and tin, and reacting said mix with vinyl chloride.

2. Process of preparing vinyl silicon chlorides which comprises reacting silicon with a chloride of a catalytic metal of the group consisting of copper and tin to reduce the chloride and thereby produce a mix containing silicon and catalytic metal, extracting residual chloride from said mix, and reacting said mix with vinyl chloride.

3. Process of preparing vinyl silicon chlorides which comprises reacting silicon with stannous chloride to reduce the latter and thereby produce a mix containing silicon and tin, extracting residual chloride from said mix, and reacting said mix with vinyl chloride.

4. Process of preparing vinyl silicon chlorides which comprises reacting silicon with a chloride of a catalytic metal of the group consisting of copper and tin to reduce the chloride and thereby produce a mix containing silicon and catalytic metal, extracting residual chloride from said mix, and heating said mix at a temperature above 200° C. in contact with vinyl chloride.

5. Process of preparing vinyl silicon chlorides which comprises reacting silicon with stannous chloride to reduce the latter and thereby produce a mix containing silicon and tin, and heating said mix at a temperature above 200° C. in contact with vinyl chloride.

CORNEILLE O. STROTHER.
GEORGE H. WAGNER.

REFERENCES CITED

The following references are of record in the file of this patent:

UNITED STATES PATENTS

| Number | Name | Date |
|---|---|---|
| 2,420,912 | Hurd | May 20, 1947 |
| 2,447,873 | Rochow | Aug. 24, 1948 |

OTHER REFERENCES

Hurd: Jour. Amer. Chem. Soc., vol. 67 (1945), pages 1813–14.